United States Patent
Tsarenko et al.

(10) Patent No.: US 10,504,215 B2
(45) Date of Patent: Dec. 10, 2019

(54) METHOD OF CORRECTING A CAPTURED IMAGE, METHOD OF SELECTING A DRAWING SKETCHED ON A PAGE OR ON TWO ADJACENT PAGES OF A NOTEBOOK, A RELATIVE APP FOR SMARTPHONE, A HARDBACK NOTEBOOK AND A HARDBACK AGENDA

(71) Applicant: MOLESKINE S.R.L., Milan (IT)

(72) Inventors: Alexey Tsarenko, Novosibirsk (RU); Peter Hobolt Jensen, Vimercate (IT)

(73) Assignee: MOLESKINE S.R.L., Milan (MI) (IT)

( * ) Notice: Subject to any disclaimer, the term of this patent is extended or adjusted under 35 U.S.C. 154(b) by 57 days.

(21) Appl. No.: 15/580,084

(22) PCT Filed: Jun. 10, 2016

(86) PCT No.: PCT/IB2016/053426
§ 371 (c)(1),
(2) Date: Dec. 6, 2017

(87) PCT Pub. No.: WO2016/199080
PCT Pub. Date: Dec. 15, 2016

(65) Prior Publication Data
US 2018/0300861 A1    Oct. 18, 2018

(30) Foreign Application Priority Data
Jun. 12, 2015    (IT) .................. 102015000023280

(51) Int. Cl.
*G06T 5/00*        (2006.01)
*G06T 3/00*        (2006.01)
(Continued)

(52) U.S. Cl.
CPC ............ *G06T 5/006* (2013.01); *G06T 3/0031* (2013.01); *G06T 5/008* (2013.01); *G06T 5/20* (2013.01);
(Continued)

(58) Field of Classification Search
USPC .................. 382/275, 254, 256, 276
See application file for complete search history.

(56) References Cited

U.S. PATENT DOCUMENTS 6,763,141 B2 * 7/2004 Xu ..................... H04N 1/00002
                                                    382/199
7,330,604 B2 * 2/2008 Wu ...................... G06K 9/3283
                                                    382/289
(Continued)

FOREIGN PATENT DOCUMENTS

EP    1193647 A2    4/2002
EP    1696383 A2 *  8/2006    ........... G06K 9/3283
(Continued)

OTHER PUBLICATIONS

Tan et al., "Restoring Warped Document Images through 3D Shape Modeling", IEEE Transactions on Pattern Analysis and Machine Intelligence, 2006, vol. 28, No. 2, pp. 195-207.
(Continued)

*Primary Examiner* — Fayyaz Alam
(74) *Attorney, Agent, or Firm* — Lucas & Mercanti, LLP

(57) ABSTRACT

A method of processing a distorted digital image depicting two adjacent pages of a notebook is disclosed. The method can also discriminate whether the distorted picture to be processed represents either a single page or two adjacent pages of a notebook, in order to carry out either a first processing algorithm if a single page has been captured or the method of processing a distorted digital image depicting two adjacent pages. The methods may be implemented via
(Continued)

software with a PC, a smartphone or a tablet. A hardback notebook and a hardback agenda are also disclosed.

11 Claims, 6 Drawing Sheets

(51) Int. Cl.
    *G06T 5/20*     (2006.01)
    *G06T 5/40*     (2006.01)
    *G06T 15/02*     (2011.01)

(52) U.S. Cl.
    CPC ................ *G06T 5/40* (2013.01); *G06T 15/02* (2013.01); *G06T 2207/10004* (2013.01); *G06T 2207/30176* (2013.01)

(56) References Cited

U.S. PATENT DOCUMENTS

| | | | |
|---|---|---|---|
| 8,107,766 B2 | 1/2012 | Kacher et al. | |
| 2002/0085247 A1* | 7/2002 | Xu | H04N 1/00002 358/504 |
| 2003/0026482 A1* | 2/2003 | Dance | G06K 9/325 382/199 |
| 2005/0053304 A1* | 3/2005 | Frei | G06T 3/0031 382/257 |
| 2006/0210192 A1* | 9/2006 | Orhun | G06K 9/32 382/275 |
| 2012/0320427 A1* | 12/2012 | Zheng | H04N 1/387 358/3.26 |
| 2013/0182950 A1* | 7/2013 | Morales | G06T 5/001 382/167 |

FOREIGN PATENT DOCUMENTS

| | | |
|---|---|---|
| EP | 1947605 A2 | 7/2008 |
| WO | 2012166982 A2 | 12/2012 |

OTHER PUBLICATIONS

International Search Report and Written Opinion for International Application No. PCT/IB2016/053426 (12 Pages) (dated Aug. 24, 2016).

* cited by examiner

METHOD OF CORRECTING A CAPTURED IMAGE, METHOD OF SELECTING A DRAWING SKETCHED ON A PAGE OR ON TWO ADJACENT PAGES OF A NOTEBOOK, A RELATIVE APP FOR SMARTPHONE, A HARDBACK NOTEBOOK AND A HARDBACK AGENDA

CROSS-REFERENCE TO RELATED APPLICATIONS

This application is a 371 of PCT/IB2016/053426, filed Jun. 10, 2016 which claims the benefit of Italian Patent Application No. 102015000023280, filed Jun. 12, 2015.

TECHNICAL FIELD

The disclosure relates to methods of capturing images sketched on a paper support and more particularly to a method of generating a corrected image from a distorted image, a method of capturing a writing or a drawing sketched on a notebook or agenda, a relative app for smartphone, a hardback notebook and a hardback agenda.

BACKGROUND

Paper notebooks or agendas are still widely diffused for taking notes, despite the ever increasing use of mobile electronic devices. The latters are of practical use when short notes are to be taken with either a physical keyboard or a virtual keyboard displayed on a touchscreen, but the formers are largely preferred for recording hand-written notes or for sketching drawings. In order to transmit or store electronically these hand-written notes or drawings, they may be digitally acquired with a scanner or, more commonly, a picture of the hand-written paper pages is taken with a digital camera of a smartphone. Scanners may generate digital images of good quality because the pages with hand-writings to be scanned are placed to lie flat on the scanner screen, but scanners generally cannot be used as portable devices.

On the other side, pictures taken with a digital camera have a poor quality because it is very difficult to place the digital camera in a plane parallel to the plane of the paper pages, especially if two adjacent pages of a notebook or agenda are to be captured at the same time. Generally speaking, pictures taken in this way are affected by severe perspective distortions that should be corrected.

A method for compensating perspective distortion of objects depicted in a paper sheet taken with a digital camera is disclosed in the European patent application EP1947605. According to this prior document, upon the disclosure of which the preamble of claim 1 is drafted, the method processes an image of a rectangular sheet of paper, having boundary markers at the corners of the sheet, according to the following operations:

calculating the smallest rectangle that encloses all the boundary markers;

building a geometric transformation to map the locations of the boundary markers to corresponding locations of the rectangle;

transforming the captured image upon the geometric transformation.

This prior method does not allow to correct perspective distortions of a picture of a drawing sketched over two adjacent pages of a notebook or agenda. In this situation, the two adjacent pages typically do not lie on a same plane and the prior algorithm is unsatisfactory because either:

the two adjacent pages are taken together and the perspective distortion around the knuckle line of the two adjacent pages is left uncorrected; or one page at the time is taken and hand-written notes or drawing extending over the two adjacent pages are not taken as a single picture.

There is still the need of an algorithm capable of correcting perspective distortion of pictures of two adjacent pages of a notebook or agenda containing hand-written notes or drawings extending over both pages.

SUMMARY

The inventors have found a method of processing a distorted digital image depicting two adjacent pages of a notebook or agenda, each page having a main marker and a plurality of subordinate markers, all the markers being located at boundaries of the page at least as vertexes of a rectangle having a nominal aspect ratio, adapted to correct perspective distortions due to the fact that the two adjacent pages of the notebook or agenda do not lie in a same plane. The method may be further improved to discriminate whether the distorted picture to be processed represents either a single page or two adjacent pages of a notebook or agenda, in order to carry out either a first processing algorithm if a single page has been captured or the above method of processing a distorted digital image depicting two adjacent pages.

According to an embodiment, it is provided a method of generating a selection image of a writing or a drawing sketched on a page or two adjacent pages of a notebook or agenda, comprising the steps of:

taking a picture with an image capture device of either a planar page or two adjacent planar pages of a notebook or agenda, capturing thereby a distorted image;

processing the distorted image with the above method, generating thereby a corrected image, discriminating in the corrected image pixels belonging to the markers, pixels belonging to the sketched writing or drawing and pixels belonging to an unwritten portion of the pages of the notebook or agenda, selecting from the corrected image the pixels belonging to the sketched writing or drawing.

These methods may be implemented via software with a PC, a smartphone or a tablet.

A hardback notebook and a hardback agenda according to this disclosure comprise at least a planar front cover and a planar back cover for covering opposite sides of the notebook or agenda and a deformable spine cover, and substantially rectangular pages bound to the covers with a binding configured so as, when the notebook or agenda is open, to allow any two planar adjacent pages at which the notebook or agenda is open to lie flat over the covers of the notebook or agenda without substantially being curved, each page of the adjacent pages having a main marker at an outer corner of the page and a plurality of subordinate markers placed at the other corners of the same page, the main markers of the two planar adjacent pages being located at diametrically opposite corners in respect to a middle point of a knuckle line of the pages of the notebook or agenda, all the markers of each page being located at boundaries of the page as vertexes of a first rectangle having a first nominal aspect ratio, the markers of two adjacent planar pages of the planar pages defining a second rectangle having a second aspect ratio.

According to an embodiment, the main marker is composed of two paired dark squares at a mutual distance smaller than the width and height of the squares, and each of the subordinate markers is a single dark square, the markers being placed over a light background.

The claims as filed are integral part of this specification and are herein incorporated by reference.

DETAILED DESCRIPTION

Figure 1:
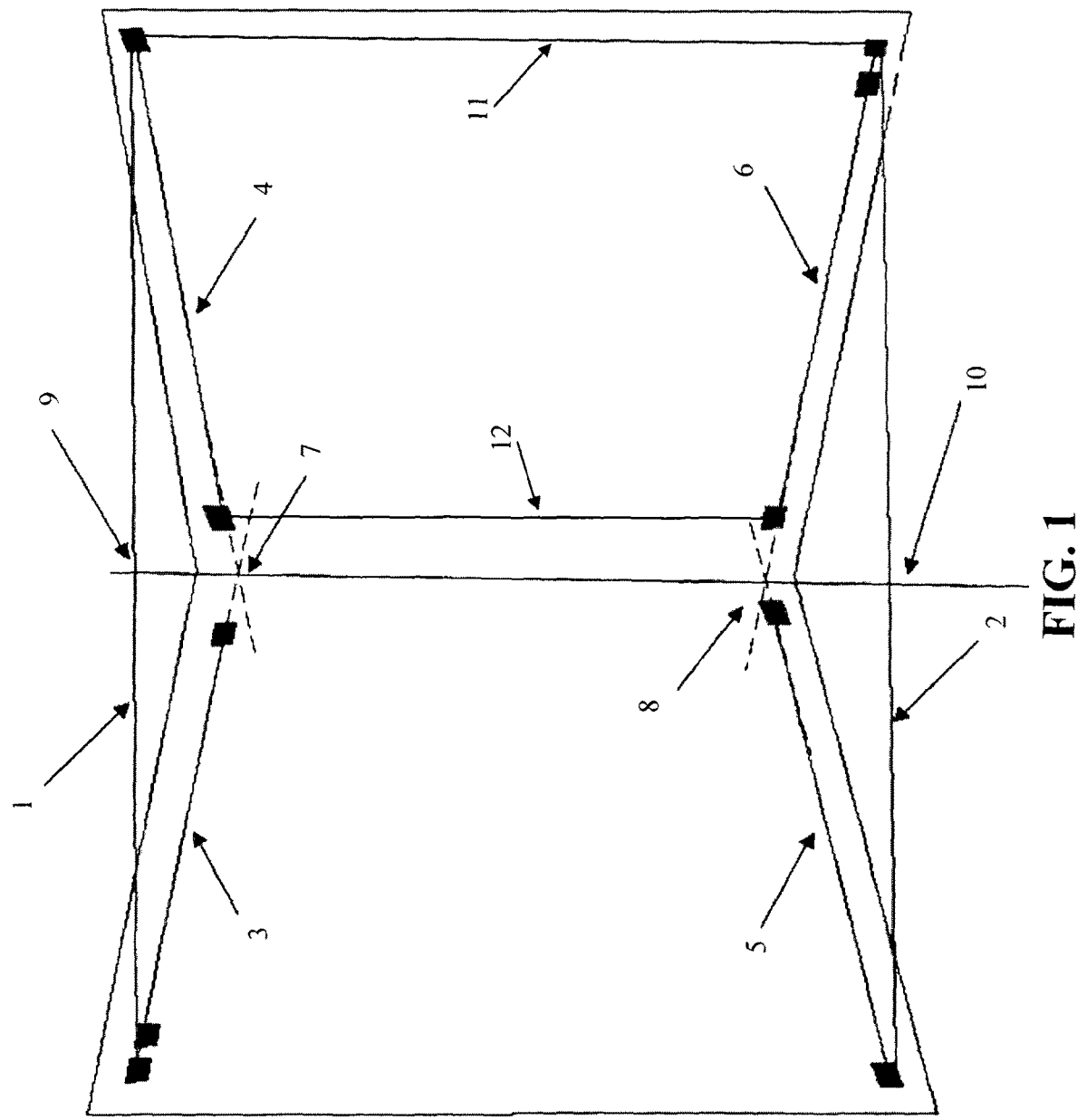
FIG. 1 schematically depicts two adjacent pages of a notebook with markers according to an embodiment of this disclosure.

The algorithm implemented with method of this disclosure for generating a corrected image from a distorted image depicting two adjacent planar pages of a notebook will be illustrated referring to FIG. 1, that depicts a picture of two planar adjacent pages of a notebook with evident perspective distortions due to the fact that the two pages do not lie in a same plane.

Each page of the notebook has a main marker, that in the non limiting shown example is composed of two paired dark squares (upper outer corner of the left page and lower outer corner of the right page) printed on a light background. Optionally, the centers of the paired dark squares are at a mutual distance smaller than the width and height of the squares. The main markers may be typically placed in correspondence of diametrically opposite outer corners of any two adjacent pages of the notebook. Each page has also a plurality of subordinate markers, that in the non limiting shown example are single dark squares printed on a light background, placed in the other corners so as to define a rectangle having a known pre-established aspect ratio.

It is simpler to detect the markers shown in FIG. 1 and to discriminate them from handwritten notes or drawings, and for this reason they are realized with dark squares. According to a less preferred embodiment, the main marker and the subordinate markers of each page have a different shape or are made of different symbols, such as for example in the prior document EP1947605. Nevertheless, in this last case, it is harder to locate them and they may be more easily erroneously recognized as part of a sketched drawing if users do not take care of writing away from them.

Typically, the pages of the notebook are bound with a binding that allows them to lie flat over the paired covers of the notebook, so as it is easy to make hand-written notes or to sketch drawings that extend over both adjacent pages. When taking a picture of both pages holding the notebook with one hand and a digital image capturing device (such as a smartphone) with the other hand, the two adjacent pages do not lie in the same plane and a distorted image as in FIG. 1 is captured.

According to the method of this disclosure, the first operation to be carried out for correcting perspective distortion of the distorted image consists in locating the positions of the subordinate markers and of the main marker in each page. Any skilled person will realize that there are numerous known ways of accomplishing this task, such as for example with a pattern recognition algorithm.

An innovative algorithm specifically designed for locating dark squares printed over a light background is disclosed hereinafter. According to a particularly effective embodiment of the method of this disclosure, the operation of locating the positions of the markers is carried out with this innovative algorithm.

Once the markers of both adjacent pages are recognized, according to the method of this disclosure certain reference lines, determined by the markers, are identified, namely:

the upper edge lines 3, 4; the line 3 passes through a marker placed at the top left angle of the left page (hereinafter referred as the "upper outer marker" of the left page) and through a marker placed at the top right angle of the left page (hereinafter referred as the "upper inner marker" of the left page); the line 4 passes through a marker placed at the top right angle of the right page (hereinafter referred as the "upper outer marker" of the right page) and through a marker placed at the top left angle of the right page (hereinafter referred as the "upper inner marker" of the right page); the two upper edge lines, passing through the respective upper outer marker and the respective upper inner marker, cross each other at an upper cross-point 7;

the lower edge lines 5, 6; the line 5 passes through a marker placed at the bottom left angle (hereinafter, the "lower outer marker") of the left page and through a marker placed at the bottom right angle of the left page (hereinafter referred as the "lower inner marker" of the left page); the line 6 passes through a marker placed at the bottom right angle of the right page (hereinafter referred as the "lower outer marker" of the right page) and through a marker placed at the bottom left angle of the right page (hereinafter referred as the "upper inner marker" of the right page); the two lower edge lines, passing through the respective lower outer marker and the respective lower inner marker, cross each other at a lower cross-point 8;

the upper side line 1;

the lower side line 2;

the knuckle line passing through the cross-points 7 and 8, that crosses the upper side line 1 and the lower side line 2 at the upper target point 9 and at the lower target point 10, respectively.

Figure 2:
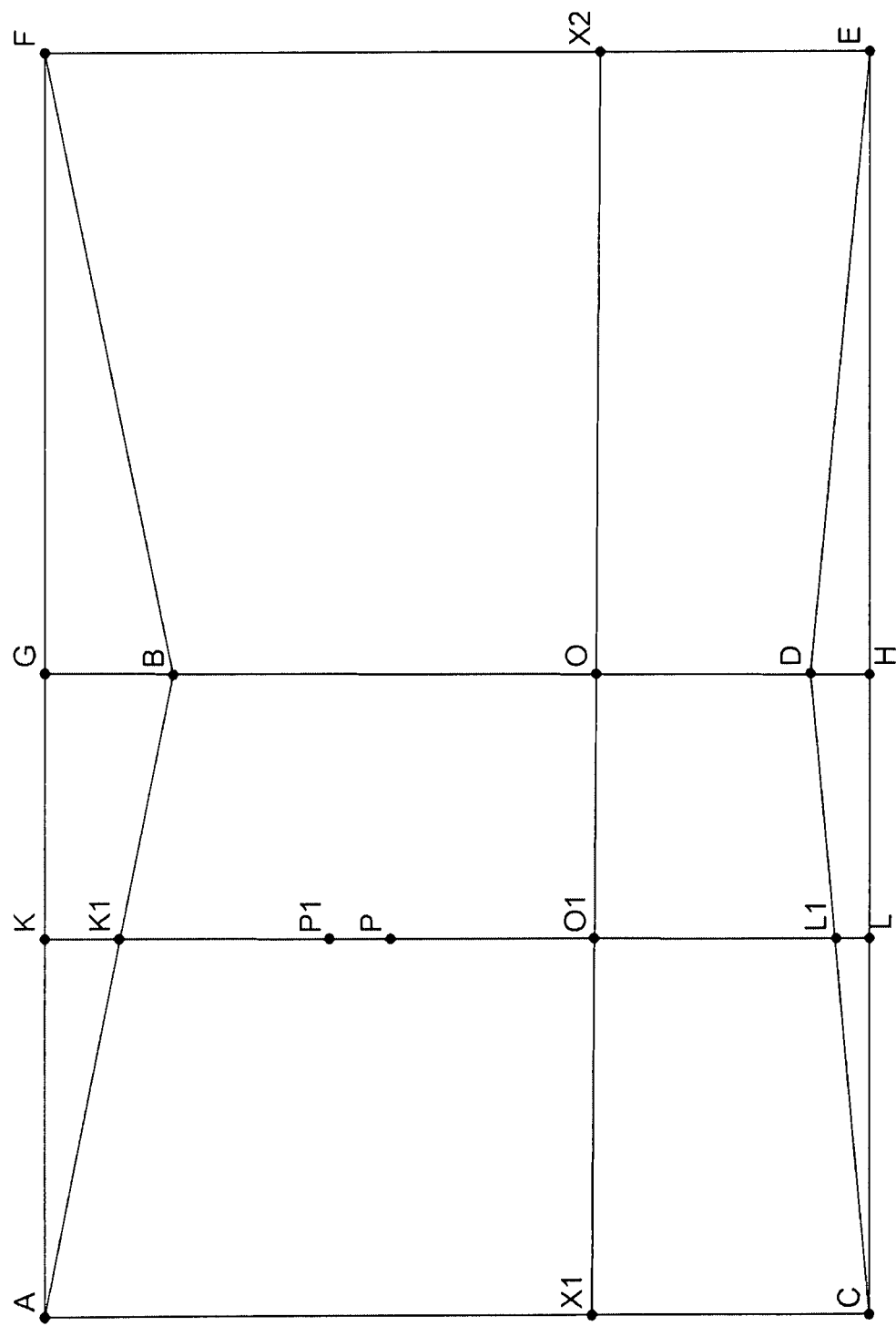
FIG. 2 illustrates geometrical points identified for correcting perspective distortion according to an embodiment of the method of this disclosure.

In order to better understand how the algorithm for correcting perspective distortion works, let us refer to the geometric representation of FIG. 2 that corresponds to the picture of FIG. 1, wherein:

A and F are the upper outer markers;

C and E are the lower outer markers;

B is the upper cross-point of the upper edge lines AB and FB;

D is the lower cross-point of the lower edge lines CD and ED;

AF is the upper side line;

CE is the lower side line;

BD (or GH) identifies the knuckle line;

G is the upper target point at which the knuckle line crosses the upper side line;

H is the lower target point at which the knuckle line crosses the lower side line;

AC and EF are the outer edge lines passing through the respective upper outer marker and lower outer marker.

The captured pages are substantially planar, thus it may be fairly assumed that the outer edge lines AC and EF are substantially parallel to each other and are parallel to the knuckle line BD.

According to an embodiment of the algorithm of this disclosure, a central fixed transformation point O is determined as the point belonging to the knuckle line GH at which the ratio between its distance OD from the lower cross-point D and its distance OH from the lower target point H equals the ratio between its distance OB from the upper cross-point B and its distance OG from the upper target point G, $$OD/OH=OB/OG$$

The algorithm determines for each captured page, a respective outer fixed transformation point X1 or X2 belonging to the respective outer edge line AC or FE as the point at which the ratio between its distance X1C or X2E from the lower outer marker C or E and its distance X1A or X2F from the upper outer marker A or F equals the ratio between the distance OD of the central fixed transformation point O from the lower cross-point D and the distance OB of the central fixed transformation point O from the upper cross-point B, $$X1C/X1A=OD/OB=X2E/X2F,$$

and determines a respective fixed transformation segment OX1 or OX2 joining the central fixed transformation point O with the respective outer fixed transformation point X1 or X2.

For each captured pixel P laying in a page area comprised between the respective fixed transformation segment OX1 or OX2 and the respective upper/lower edge line, a corresponding intermediate pixel P1 is determined according to an image stretching algorithm that keeps unchanged all points of the outer edge line AC or FE and all points of the fixed transformation segment OX1 or OX2, and that maps points laying in the page area so as to elongate the knuckle line to bring the upper/lower cross-point (B or D) into the upper/lower target point (G or H) and so as to transform the upper/lower edge line (AB or CD) into the upper/lower side line (AF or CE).

In general, any image stretching algorithm could be used for this operation. The applicant has found that a particularly effective image stretching algorithm that provides outstanding results, and that comprises the following steps:

determining a parallel line K1O1 to the knuckle line passing through a captured pixel P, crossing the respective fixed transformation segment OX1 at a relative fixed point O1, crossing the respective upper/lower edge line at a relative upper/lower point K1 or L1, and crossing the respective upper/lower side line at a relative upper/lower target point K or L, and determining the corresponding intermediate pixel P1 so as the ratio between its distance P1O1 from the relative fixed point O1 and the distance PO1 of the captured pixel P from the relative fixed point O1 equals the ratio between the distance of the relative upper/lower target point from the relative fixed point O1 and the distance of the relative upper/lower point from the relative fixed point O1, $$P1O1/PO1=KO1/K1O1.$$

Whatever the image stretching algorithm is used, it is obtained an intermediate image composed of the intermediate pixels P1 and having a guiding trapezoid, the bases of which are the outer lines AC and FE and the sides of which are the side lines AF and CE.

Finally, a corrected image corresponding to the originally taken distorted image is obtained by determining locations of corrected pixels of the corrected image by processing pixels of the intermediate image with a perspective correction algorithm adapted to transform the guiding trapezoid into a rectangle having the pre-established nominal aspect ratio, keeping as a reference a base of the guiding trapezoid.

Perspective correction algorithms adapted to transform a trapezoid into a rectangle of a pre-established aspect ratio are well known in the art. Merely as an example, it is possible to mention the perspective correction algorithm developed by ABBYY Production LLC and illustrated at the following web-page:

http://www.abbyy.com/mobile_imaging_sdk/description/#function26 for transforming a trapezoidal shape into a rectangular shape, though the skilled person may readily identify numerous other alternative algorithms capable of performing the same operation.

Figure 3:
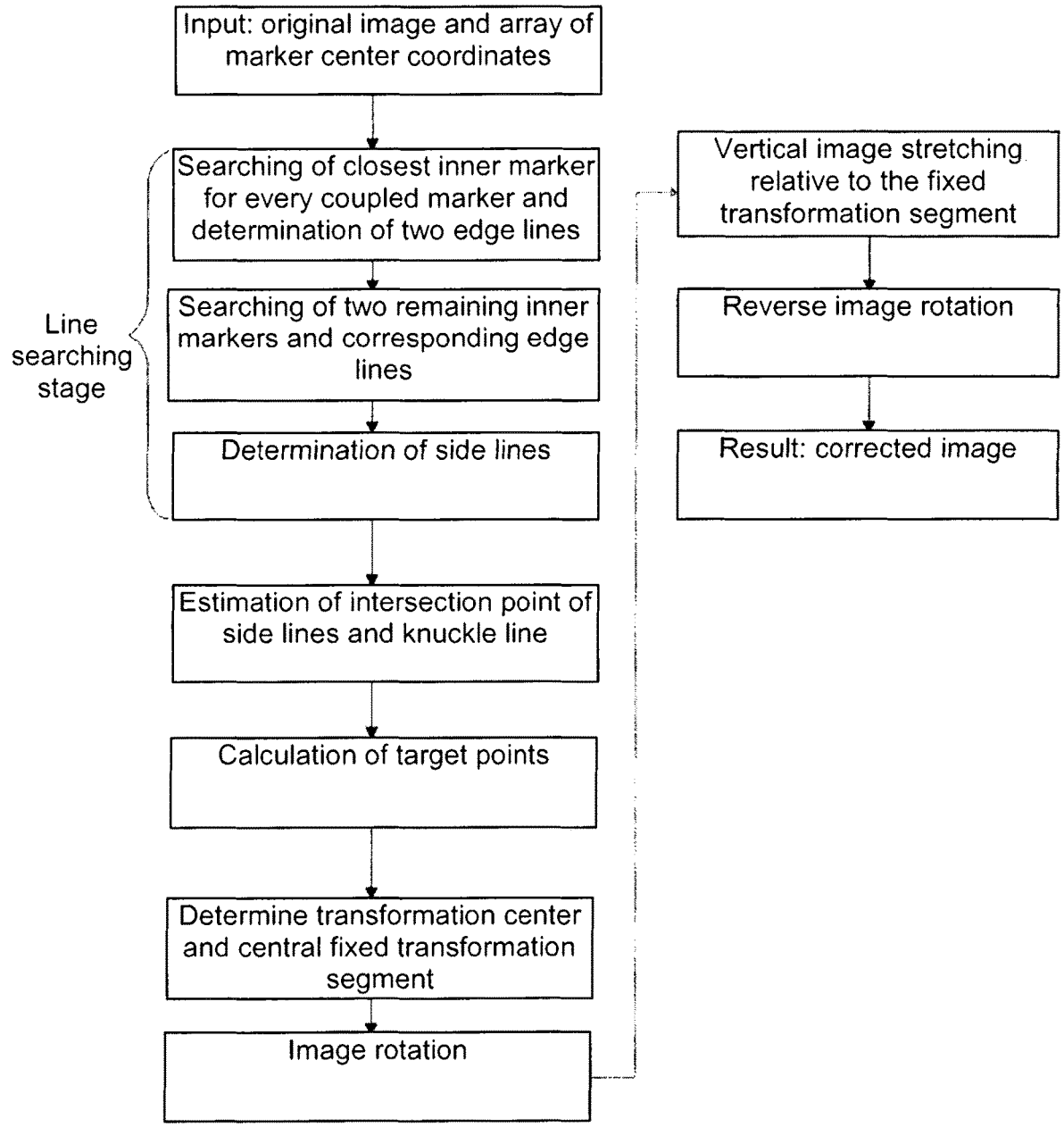
FIG. 3 is a flow chart of an embodiment of an algorithm "unwarp pages" for correcting perspective distortion of a drawing spanning over two adjacent pages of a notebook.

Optionally, in order to simplify calculations involved in the above image stretching algorithm according to this disclosure, the distorted image is rotated in order to orient vertically the knuckle line and the outer edge lines before executing the image stretching algorithm, then an inverse rotation is applied after having executed the image stretching algorithm. All steps carried out according to this embodiment are summarized in the flow chart of FIG. 3.

The method of this disclosure may be further improved to manage distorted images representing pictures of two adjacent pages or of a single page of a notebook or agenda, recognizing whether the user has taken a "portrait picture" (a single page) or a "landscape picture" (two adjacent pages).

Since each page contains only one main marker, according to an embodiment of the method of this disclosure, the number of main markers captured in the distorted image to be corrected are counted. If two main markers are detected, the algorithm continues as illustrated above, otherwise if only one main marker is detected in the distorted image, the intermediate image of a single captured page of said notebook or agenda is obtained by:

determining relative positions, in respect to the main marker, of subordinate markers belonging to the captured page and determining the upper edge line joining two upper markers of the markers of the captured page, the lower edge line joining two lower markers of the markers of the captured page, the outer edge line joining two outer markers of the markers of the captured page, the inner edge line joining two inner markers of the markers of the captured page, wherein the outer edge line crosses the lower edge line and the upper edge line in correspondence of the lower outer marker and of the upper outer marker, respectively; and determining the intermediate image as the image containing captured pixels of the distorted image, and determining the guiding trapezoid composed of the upper edge line, of the lower edge line, of the outer edge line and of the inner edge line.

Finally, a perspective correction algorithm for transforming a trapezoidal shape into a rectangular shape is applied for generating the corrected image.

Once the corrected image has been obtained, it is possible to generate a selection image (hereinafter referred to as "Crop" operation) of the writing or drawing made on the notebook or agenda by filtering out background pixels belonging to unwritten areas or to the markers.

Figure 4:
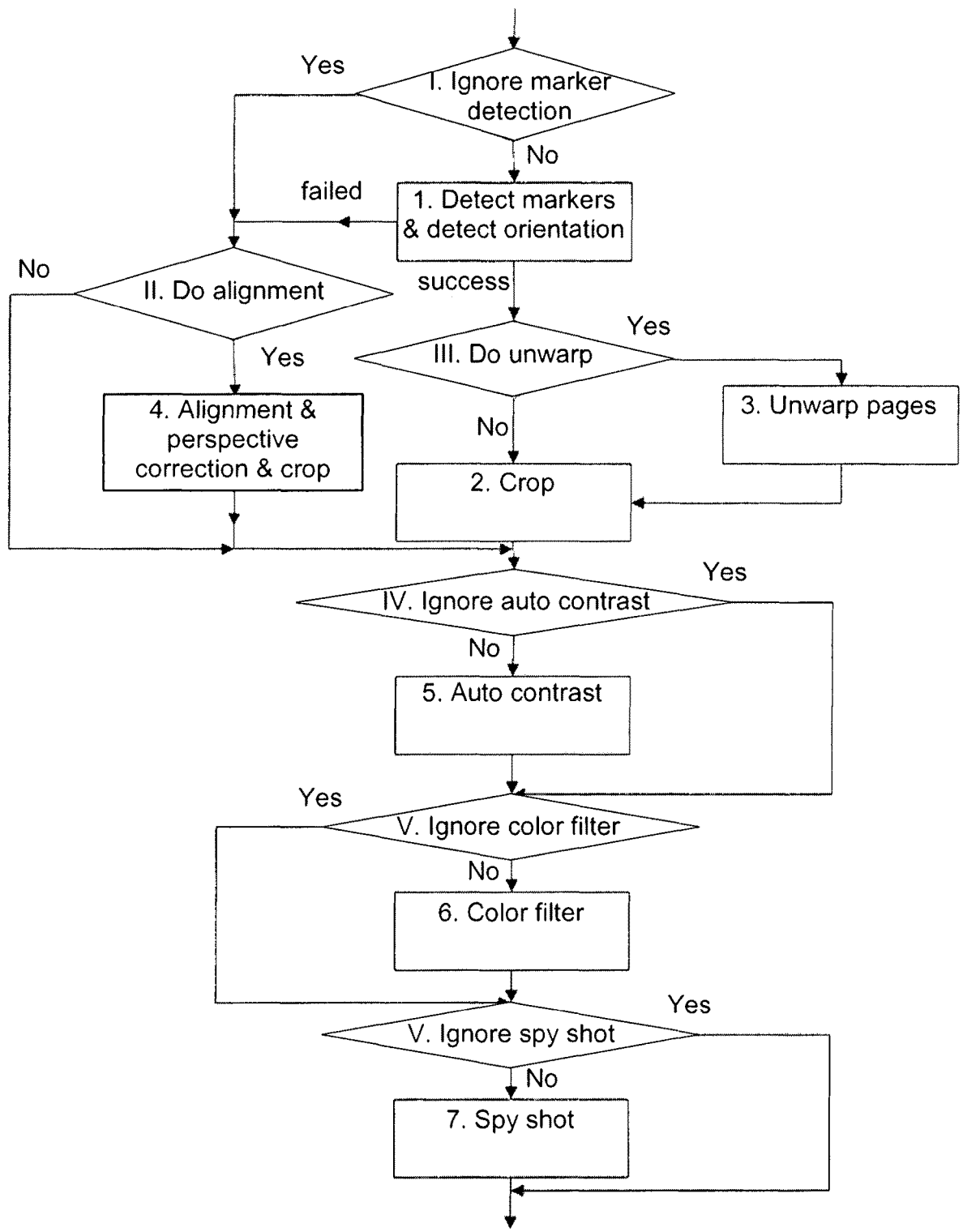
FIG. 4 is a flow chart of an embodiment according to this disclosure of a method for generating a selection image of a writing or a drawing sketched on one page or two adjacent pages of a notebook or agenda.

As an option, it is possible to carry out other operations for enhancing the quality of the selected writing or drawing, such as tuning brightness and contrast, adjusting colors, removing noise. Numerous algorithms adapted to perform these operations are available, such as for example the algorithms developed by ABBYY Production LLC and illustrated at the following web page:

http://www.abbyycom/mobile_imaging_sdk/description/A flow chart of another embodiment of the method of this disclosure for correcting distorted images that may represent a single planar page or two adjacent planar pages is depicted in FIG. 4. The algorithm for generating a corrected image from a distorted image representing one or two pages is called "Unwarp Pages" in the flow chart. According to FIG. 4, the "Unwarp Pages" algorithm may not be executed if users decide to ignore the detection of markers or if detection of markers has not been possible. The various operations mentioned in the flow chart of FIG. 4 are listed below:

1.1. Detect Markers & detect orientation—searches markers on the image and detects page orientation—landscape (two-pages) or portrait (one-page). A particularly effective way of executing this operation according to this disclosure will be illustrated in detail hereinafter.

1.2. Crop—determines the edges of a document relative to the background, so that the background could be cropped. Provides coordinates of the area that should be cropped (four corners of the quadrangle). [http://www.abbyy.com/mobile_imaging_sdk/description/#function15]

1.3. Unwarp Pages—corrects image in such way that result image would look as a double-page spread with pages in plane.

1.4. Alignment & perspective correction & crop
  1.4.1. Perspective correction—Corrects perspective distortions (from trapezoidal shape to rectangular) [http://www.abbyy.com/mobile_imaging_sdk/description/#function26]
  1.4.2. Alignment & Crop—see 1.2.

1.5. Auto contrast—automatic tuning of brightness and contrast [http://www.abbyy.com/mobile_imaging_sdk/description/#function13]

1.6. Color filter—combines a group of functions for processing color documents. The operations are applied in the following order: automatic adjustment of brightness and contrast, the document background is turned white. [http://www.abbyy.com/mobile_imaging_sdk/description/#function6]

1.7. Spy shot—combines a group of functions for processing blurry, out-of-focus, and dark pictures. The operations are applied in the following order: noise removal, reduction of brightness, adjustment of brightness and contrast. [http://www.abbyy.com/mobile_imaging_sdk/description/#function9]

Figure 5:
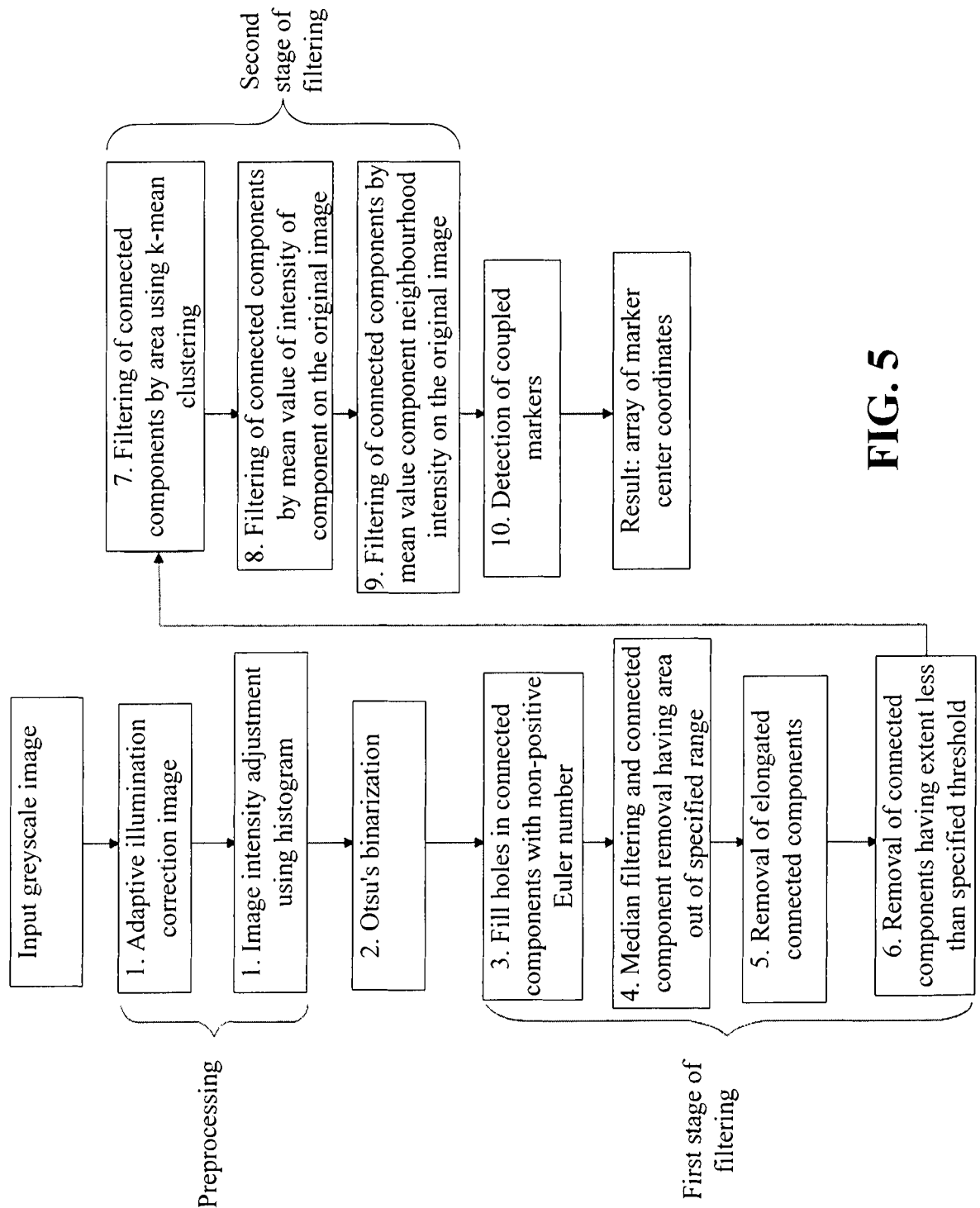
FIG. 5 is a flow chart of an embodiment of an algorithm according to this disclosure for locating markers printed on the pages of a notebook or agenda.
Figure 6:
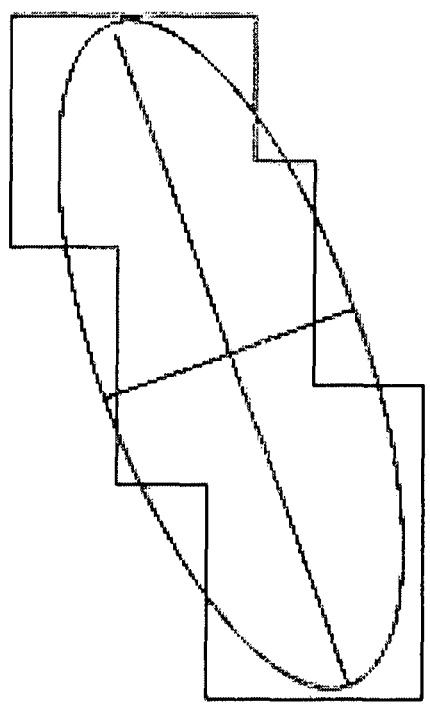
FIG. 6 schematically illustrates how is determined an ellipse having the same second statistical moments of a cluster of pixels.

A particularly effective algorithm for locating in the distorted image all the markers when the main marker is made of two paired dark squares and each of the subordinate markers is composed of a single dark square over a light background, is described hereinbelow referring to the flow chart of FIG. 5 and to the ellipses depicted in FIG. 6.

This algorithm is intended to detection of the markers captured in the distorted image and comprises of the following steps:

1.1. The input image (i.e. the distorted image) may be subjected to preprocessing in order to maximize the contrast of markers to the background. This step may be useful for simplifying the operation of locating the markers. Preprocessing may include adaptive illumination correction and image intensity correction, for example using the image histogram. Adaptive illumination correction may be performed by pointwise calculating the local average intensity value and performing a subsequent image intensity alignment in respect to this value. Further image intensity correction may be performed using the brightness histogram of the image, for example with an algorithm for "stretching" the brightness histogram of the image to span over the whole range of the gray scale [http://imageprocessing-blog.com/histogram-adjustments-in-matlab-part-i]

1.2. Image binarization, for example the so-called Otsu's binarization, separates connected components (segments) (value 0) and the background (value 1). This step allows to determine a black-and-white binary image the pixels of which have either a high or a low intensity, by comparing with a threshold the intensity of corresponding pixels of the captured image. In the black-and-white binary image it is possible to locate groups of connected pixels either black or white surrounded by either white or black pixels. Further processing procedures are required for selecting connected groups of pixels that correspond to markers.

1.3. A first stage of filtering may consist of steps that do not require calculation of the statistical characteristics on a set of connected groups of pixels, such as the sample mean and sample variance. The eventual presence and the number of holes in connected groups of pixels (white/black pixels into connected groups of black/white pixels) may be determined by calculating the so-called Euler number (see R. C. Gonzalez and R. E. Woods (2002), Digital Image Processing, Prentice-Hall, p. 661, herein incorporated by reference, or http://www.mathworks.com/help/images/ref/bweuler.html). Filling holes in connected group of pixels eliminates eventual holes in the binary image in the each of the connected groups of pixels [http://www.mathworks.com/help/images/ref/imfill.html] and allows an easier identification of the markers, especially if made of dark squares printed on a light background.

1.4. Optionally, it may be possible to eliminate single-point noise on the image by means of a median filtering. In order to identify connected groups of pixels that clearly cannot represent the markers because they span over a too large area, it may be appropriate to remove connected groups of pixels of the binary image having area out of a range of tolerance about the value of an expected area for a given image size of the dark squares that constitute the marker, leaving connected groups of pixels whose area is close to the expected area of connected groups of pixels belonging to the markers.

1.5. Removal of elongated connected groups of pixels (see FIG. 6) may be performed by calculating the second moments for the connected components contours, determining the axes lengths of the ellipse having the same second moments, and calculating the ratio of the semiaxis lengths. The algorithm removes these connected components, wherein the ratio between the semi-major axis length and the semi-minor axis length exceeds a threshold value [http://www.mathworks.com/help/images/ref/regionprops.html#bqke8jb].

1.6. Optionally, it may be possible to perform a removal of connected groups of pixels having too low extent with a threshold procedure in order to identify more quickly the dark squares that constitute the markers. A bounding rectangle of connected groups of pixels may be determined and the ratio between the area of the connected groups of pixels and the area of the bounding rectangle may be calculated. It is assumed that this ratio is close to unity for markers because they are made of dark squares.

1.7. The second stage of filtering may use the statistical characteristics of the set of connected components. When filtering connected components by area the set of connected components areas is calculated, which is divided into two clusters by k-means clustering [https://en.wikipedia.org/wiki/K-means_clustering]. It is assumed that all the markers on the original image will be found in the same cluster, because possible perspective distortions do not change their areas significantly. The cluster which mean is greater is selected. The connected groups of pixels belonging to this cluster will be retained on the image.

1.8. Markers on the original image have low average intensity. Filtering may be performed in the following way. Each connected groups of pixels identifies the corresponding region on the initial image. The mean intensity value of the region is calculated during filtering. If this value exceeds the threshold specified then this connected groups of pixels is removed. This filtering leaves those connected groups of pixels for which this value is less than a threshold. Typically, this threshold may be calculated dynamically.

1.9. Filtering of connected components by mean value of component neighborhood intensity on original image may be performed similarly to the previous step. At this step, mean intensity of neighboring pixels that surround connected group of pixels is determined. The mean intensity value of the neighborhood is defined by the connected component contour shape. It is assumed that the marker has a contrasting background, so the mean intensity of the vicinity of each group of pixels must be above a certain threshold, which may be typically calculated dynamically. Thus, the connected groups of pixels having mean intensity smaller than this threshold are removed. At the end of this step, the dark squares that constitute the markers are identified.

1.10. Once the dark squares of the markers are identifies, the main marker may be discriminated from the subordinate markers in order to correct the orientation of the image. In order to determine paired dark squares constituting a main marker, centers of connected groups of pixels are determined. Two connected groups of pixels form a main marker if the distance between them is smaller than the average width and average height of the two connected groups of pixels.

The output of the method of this disclosure is a corrected image of the captured pages in which perspective distortion has been corrected. This corrected image may be processed according to well-known image processing techniques for generating a selection image containing only the pixels belonging to the writing or drawings, filtering out the pixels belonging to the markers and to unwritten portions of the page (background).

The various embodiments of the method of this disclosure may be implemented via a software code run by a computer. According to an embodiment, the software code is an "app" executable by smartphones or tablet computers, that may optionally be configured to allow the smartphone or tablet computer to send the corrected image or the selection image as an image file to a communication hub and/or to a server of a cloud network.

The invention claimed is:

1. An electronic device configured to implement a method of generating a corrected image from a distorted image depicting at least a planar page having a main marker and a plurality of subordinate markers, all said markers of said page being located at boundaries of the page defining vertexes of a first rectangle having a first nominal aspect ratio, the method comprising the following operations:
   a) locating, in said distorted image, positions of captured subordinate markers and of a captured main marker,
   b) determining a geometric transformation to map locations of corrected pixels of said corrected image corresponding to captured pixels of said distorted image,
   c) generating said corrected image containing said corrected pixels at the locations determined at step b),
wherein the markers of two adjacent planar pages of said planar pages define a second rectangle having a second aspect ratio, in that said distorted image depicts two adjacent planar pages of a notebook or agenda, and in that said operation b) is carried out through the following steps:
   b3) generating an intermediate image of the two adjacent pages of said notebook or agenda throughout the following steps:
      for each captured page of said two adjacent pages, determining relative positions, in respect to said main marker, of subordinate markers belonging to said captured page and determining an upper edge line (AB; FB) joining two upper markers of the markers of said captured page, a lower edge line (CD; ED) joining two lower markers of the markers of said captured page, an outer edge line (AC; FE) joining two outer markers of the markers of said captured page, an upper side line (AF) joining two upper outer markers of the markers of said two adjacent pages, a lower side line (CE) joining two lower outer markers of the markers of said two adjacent pages, an upper cross-point (B) between the upper edge lines (AB, FB) of said two adjacent pages, a lower cross-point (D) between the lower edge lines (CD, ED) of said two adjacent pages, a knuckle line (BD) of said two adjacent pages passing through said upper cross-point (B) and said lower cross-point (D), an upper target point (G) as intersection point between said knuckle line (BD) and said upper side line (AF), a lower target point (H) as intersection point between said knuckle line (BD) and said lower side line (CE), said outer edge line (AC; FE) crossing said lower edge line (CD; ED) and said upper edge line (AB; FB) in correspondence of a lower outer marker (C; E) and of an upper outer marker (A; F), respectively,
      determining a central fixed transformation point (O) belonging to said knuckle line (BD) as the point at which the ratio between its distance (OD) from the lower cross-point (D) and its distance (OH) from the lower target point (H) equals the ratio between its distance (OB) from the upper cross-point (B) and its distance (OG) from the upper target point (G),
      for each captured page of said two adjacent pages, determining a respective outer fixed transformation point (X1; X2) belonging to the respective outer edge line (AC; FE) as the point at which the ratio between its distance (X1C; X2E) from the lower outer marker (C; E) and its distance (X1A; X2F) from the upper outer marker (A; F) equals the ratio between the distance (OD) of said central fixed transformation point (O) from the lower cross-point (D) and the distance (OB) of said central fixed transformation point (O) from the upper cross-point (B), and determining a respective fixed transformation segment (OX1; OX2) joining the central fixed transformation point (O) with the respective outer fixed transformation point (X1; X2), then, for each captured pixel (P) laying in a page area comprised between the respective fixed transformation segment (OX1; OX2) and the respective upper/lower edge line (AB/CD; FB/ED), determining a corresponding intermediate pixel (P1) according to an image stretching algorithm that keeps unchanged all points of said outer edge line (AC; FE) and all points of said fixed transformation segment (OX1; OX2) and that maps points laying in said page area so as to elongate said knuckle line to bring said upper/lower cross-point (B; D) into said upper/lower target point (G; H) and so as to transform said upper/lower edge line (AB; CD) into said upper/lower side line (AF; CE), determining said intermediate image containing said intermediate pixels of said two adjacent pages and a guiding quadrilateral composed of said upper side line (AF), of said lower side line (CE) and of said outer edge lines (AC, FE); and b4) determining locations of corrected pixels of said corrected image by processing pixels of said intermediate image with a perspective correction algorithm adapted to transform said guiding quadrilateral into a rectangle having said nominal second aspect ratio by taking as a reference side said outer edge line or said inner edge line and by adjusting the length of the other lines of the quadrilateral accordingly.

2. An electronic device configured to implement a method of generating a corrected image from a distorted image depicting at least a planar page having a main marker and a plurality of subordinate markers, all said markers of said page being located at boundaries of the page defining vertexes of a first rectangle having a first nominal aspect ratio, the method comprising:

a) locating, in said distorted image, positions of captured subordinate markers and of a captured main marker, b) determining a geometric transformation to map locations of corrected pixels of said corrected image corresponding to captured pixels of said distorted image, c) generating said corrected image containing said corrected pixels at the locations determined at step b), wherein the markers of two adjacent planar pages of said planar pages define a second rectangle having a second aspect ratio, in that said distorted image may represent a single planar page or two adjacent planar pages of a notebook or agenda, and in that said operation b) is carried out through the following steps:

b1) counting the number of captured main markers detected in said distorted image;

b2) if only one main marker is detected in said distorted image, then determining an intermediate image of a single captured page of said notebook or agenda throughout the following steps:

determining relative positions, in respect to said main marker, of subordinate markers belonging to said captured page and determining an upper edge line joining two upper markers of the markers of said captured page, a lower edge line joining two lower markers of the markers of said captured page, an outer edge line joining two outer markers of the markers of said captured page, an inner edge line joining two inner markers of the markers of said captured page, said outer edge line crossing said lower edge line and said upper edge line in correspondence of a lower outer marker and an upper outer marker, respectively, and determining said intermediate image containing captured pixels of said distorted image and a guiding quadrilateral composed of said upper edge line, of said lower edge line, of said outer edge line and of said inner edge line;

b3) if two main markers are detected in said distorted image, generating an intermediate image of two adjacent pages of said notebook or agenda throughout the following steps:

for each captured page of said two adjacent pages, determining relative positions, in respect to said main marker, of subordinate markers belonging to said captured page and determining an upper edge line (AB; FB) joining two upper markers of the markers of said captured page, a lower edge line (CD; ED) joining two lower markers of the markers of said captured page, an outer edge line (AC; FE) joining two outer markers of the markers of said captured page, an upper side line (AF) joining two upper outer markers of the markers of said two adjacent pages, a lower side line (CE) joining two lower outer markers of the markers of said two adjacent pages, an upper cross-point (B) between the upper edge lines (AB, FB) of said two adjacent pages, a lower cross-point (D) between the lower edge lines (CD, ED) of said two adjacent pages, a knuckle line (BD) of said two adjacent pages passing through said upper cross-point (B) and said lower cross-point (D), an upper target point (G) as intersection point between said knuckle line (BD) and said upper side line (AF), a lower target point (H) as intersection point between said knuckle line (BD) and said lower side line (CE), said outer edge line (AC; FE) crossing said lower edge line (CD; ED) and said upper edge line (AB; FB) in correspondence of a lower outer marker (C; E) and of an upper outer marker (A; F), respectively, determining a central fixed transformation point (O) belonging to said knuckle line (BD) as the point at which the ratio between its distance (OD) from the lower cross-point (D) and its distance (OH) from the lower target point (H) equals the ratio between its distance (OB) from the upper cross-point (B) and its distance (OG) from the upper target point (G), for each captured page of said two adjacent pages, determining a respective outer fixed transformation point (X1; X2) belonging to the respective outer edge line (AC; FE) as the point at which the ratio between its distance (X1C; X2E) from the lower outer marker (C; E) and its distance (X1A; X2F) from the upper outer marker (A; F) equals the ratio between the distance (OD) of said central fixed transformation point (O) from the lower cross-point (D) and the distance (OB) of said central fixed transformation point (O) from the upper cross-point (B), and determining a respective fixed transformation segment (OX1; OX2) joining the central fixed transformation point (O) with the respective outer fixed transformation point (X1; X2), then, for each captured pixel (P) laying in a page area comprised between the respective fixed transformation segment (OX1; OX2) and the respective upper/lower edge line (AB/CD; FB/ED), determining a corresponding intermediate pixel (P1) according to an image stretching algorithm that keeps unchanged all points of said outer edge line (AC; FE) and all points of said fixed transformation segment (OX1; OX2) and that maps points laying in said page area so as to elongate said knuckle line to bring said upper/lower crosspoint (B; D) into said upper/lower target point (G; H) and so as to transform said upper/lower edge line (AB; CD) into said upper/lower side line (AF; CE), determining said intermediate image containing said intermediate pixels of said two adjacent pages and a guiding quadrilateral composed of said upper side line (AF), of said lower side line (CE) and of said outer edge lines (AC, FE); and b4) determining locations of corrected pixels of said corrected image by processing pixels of said intermediate image with a perspective correction algorithm adapted to transform said guiding quadrilateral into a rectangle having either said first nominal aspect ratio or said second nominal aspect ratio depending on whether said distorted image represent a single planar page or two adjacent planar pages, respectively, by taking as a reference side one of said outer edge lines and by adjusting the length of the other lines of the quadrilateral accordingly.

3. The electronic device of claim 1, wherein said guiding quadrilateral is substantially a trapezoid a base of which is one of said outer edge lines, and said image stretching algorithm comprises the steps of:

determining a parallel line (K1O1) to said knuckle line passing through said captured pixel (P), crossing the respective fixed transformation segment (OX1; OX2) at a relative fixed point (O1), crossing the respective upper/lower edge line (AB/CD; FB/ED) at a relative upper/lower point (K1; L1) and crossing the respective upper/lower side line (AF; CE) at a relative upper/lower target point (K; L), and determining said corresponding intermediate pixel (P1) so as the ratio between its distance (P1O1) from the relative fixed point (O1) and the distance (PO1) of said captured pixel (P) from the relative fixed point (O1) equals the ratio between the distance (KO1) of said relative upper/lower target point (K; L) from the relative fixed point (O1) and the distance (K1O1) of said relative upper/lower point (K1; L1) from the relative fixed point (O1).

4. The electronic device of claim 1, wherein the method further comprises the step of rotating said distorted image in order to orient vertically either said inner edge line or said knuckle line.

5. The electronic device of claim 1, wherein said main marker is composed of two paired dark squares at a mutual distance smaller than the width and height of the squares and each of said subordinate markers is a single dark square, said markers being placed over a light background, and wherein said operation a) is carried out through the following steps:

a1) pre-processing said distorted image with an algorithm of adaptive illumination correction performed by pointwise calculating a local average intensity value of pixels in a neighborhood of a pixel of said distorted image and performing an image intensity alignment in respect to said local average intensity value for determining a corresponding pre-processed pixel;

a2) determining a black-and-white binary image the pixels of which have either a high or a low intensity, by comparing with a threshold the intensity of corresponding pre-processed pixels of the distorted image;

a3) locating groups of connected pixels of said black-and-white binary image, then within said groups of connected pixels of said black-and-white binary image locating eventual pixels surrounded thereby having an intensity of opposite value in respect to intensity of said connected pixels and correcting said opposite value with a filling algorithm so as the groups of connected pixels appear as a uniformly filled area without holes;

a4) determining for each connected group of pixels the second order statistical moments along two coordinate axis, and determining semiaxis lengths of a corresponding ellipse having the same second order statistical moments, then for each of said ellipses, comparing with a second threshold the ratio between the lengths its semi-major axis and its semi-minor axis, then filtering out the corresponding groups for which said second threshold is exceeded or said semi-minor axis is smaller than a third threshold, and retaining the remaining groups;

a5) processing, with a k-means clustering algorithm, the pixels of said distorted image corresponding to the retained groups at step a4) for locating two clusters of pixels, and retaining the pixels belonging to the cluster with the greatest mean;

a6) locating groups of connected pixels belonging to the cluster retained at step a5), comparing the mean intensity of each group with a fourth threshold, then filtering out groups of pixels for which said fourth threshold is exceeded and retaining groups of pixels for which said fourth threshold is not exceeded;

a7) locating contour pixels that surround the groups of connected pixels retained at step a6), comparing the mean intensity of said contour pixels of each group with a fifth threshold, then filtering out groups of pixels for which said fifth threshold is not exceeded and retaining groups of pixels for which said fifth threshold is exceeded, the retained groups of pixels corresponding to the dark squares of said markers of the captured page; and a8) discriminating the main marker from the subordinate markers by processing the groups of pixels retained at step a7) by locating the center of each of said groups of pixels and by determining two groups of pixels at a mutual distance smaller than the average width and average height of the two groups of pixels.

6. The electronic device of claim 5, wherein the method further comprises the step of enhancing contrast of said distorted image with a histogram stretching algorithm before determining said black-and-white binary image.

7. The electronic device of claim 5, wherein the method further comprises at least one of the following operations:

after said step a3) and before said step a4), filtering out also single-point noise by means of a median filtering of the black-and-white image;

after said step a3) and before said step a4), determining also the area of each of said groups of connected pixels and filtering out groups of connected pixels whose area exceeds a sixth threshold;

after said step a4) and before executing said step a5), determining for each of said groups of connected pixels an enclosing rectangle, the area of said enclosing rectangle and the area of the considered group of connected pixels, then filtering out the groups of connected pixels for which the ratio between the area of said enclosing rectangle and the area of the considered group of connected pixels is not comprised in a pre-established range around 1.

8. An electronic device configured to implement a method of generating a selection image of a writing or a drawing sketched on a page or on two adjacent pages of a notebook or agenda comprising at least a planar front cover and a planar back cover for covering opposite sides of the notebook or agenda and a deformable spine cover, and rectangular pages bound to said covers with a binding configured so as, when the notebook or agenda is open, any two planar adjacent pages at which the notebook or agenda is open lie flat over said covers of the notebook or agenda without substantially being curved, each page of said adjacent pages having a main marker at an outer corner of the page and a plurality of subordinate markers placed at the other corners of the same page, the main markers of said two planar adjacent pages being located at diametrically opposite corners in respect to a middle point of a knuckle line of said pages of the notebook or agenda, all said markers of each page being located at boundaries of the page as vertexes of a first rectangle having a first nominal aspect ratio, the markers of two adjacent planar pages of said planar pages defining a second rectangle having a second aspect ratio, the method comprising the following steps:

taking a picture with an image capture device of either a planar page or of two adjacent planar pages of a notebook or agenda, capturing a distorted image;

processing said distorted image with the method of claim 2, generating a corrected image;

discriminating in said corrected image pixels belonging to said markers, pixels belonging to said sketched writing or drawing and pixels belonging to an unwritten portion of said pages of the notebook or agenda; and generating said selection image by selecting from the corrected image said pixels belonging to said sketched writing or drawing.

9. The electronic device of claim 8, wherein the method further comprises processing said corrected image with an algorithm chosen in the set composed of blurry correction, out-of-focus correction, brightness and/or contrast correction and noise removal, before generating said selection image.

10. A computer program for PC or a mobile app for smartphones or tablet computers, comprising a software code for executing the method steps of claim 1 when run by a PC or a smartphone or a tablet computer.

11. A computer program for PC or a mobile app for smartphones or tablet computers, comprising a software code for executing the method steps of claim 2 when run by a PC or a smartphone or a tablet computer.

* * * * *